Sept. 8, 1959
E. S. CORNELL, JR
2,903,668
MULTIPLE CONNECTOR
Filed Sept. 26, 1955
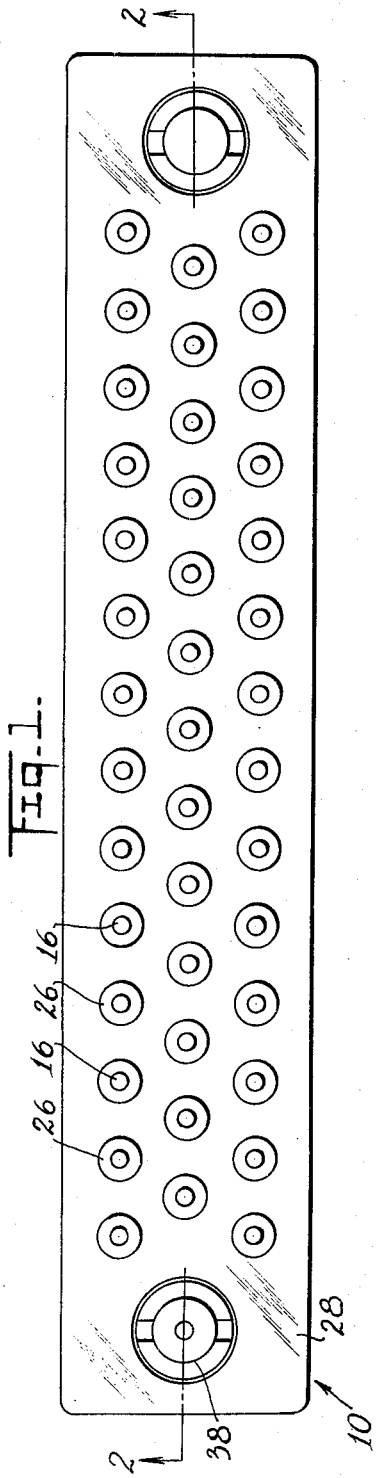
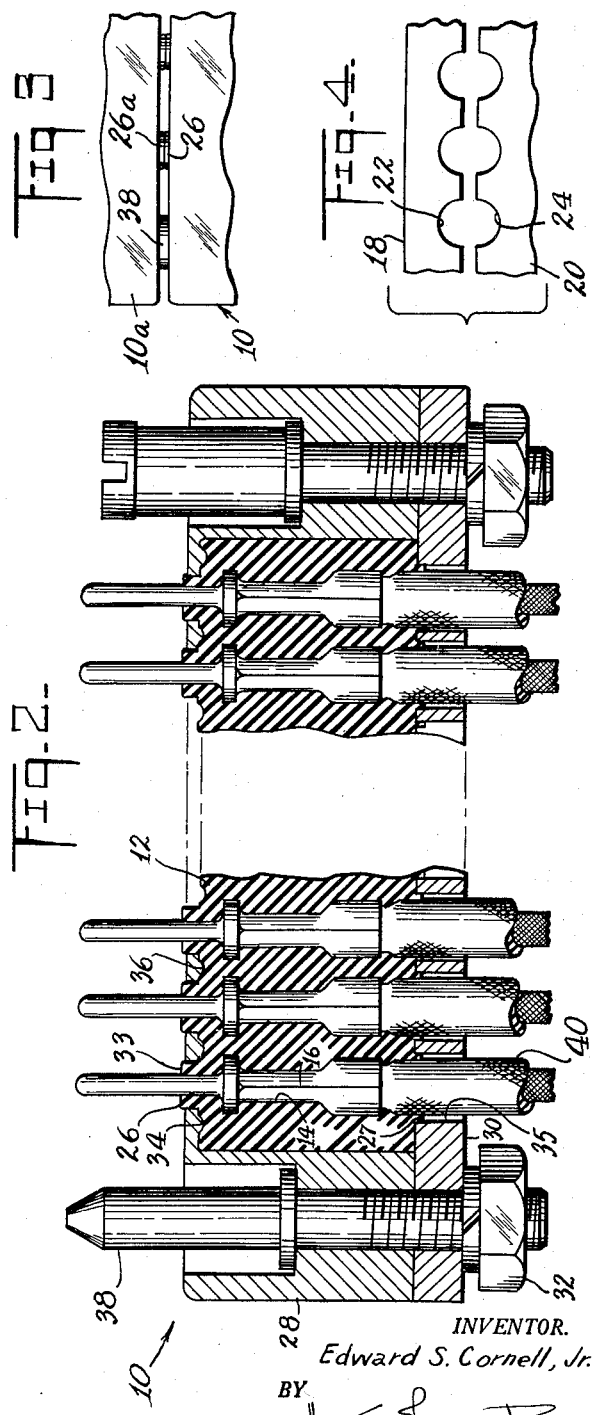
INVENTOR.
Edward S. Cornell, Jr.
BY
Harry Ernest Rubens
atty

2,903,668

MULTIPLE CONNECTOR

Edward S. Cornell, Jr., Westport, Conn., assignor to Burndy Corporation, a corporation of New York Application September 26, 1955, Serial No. 536,422

1 Claim. (Cl. 339—63)

My invention relates to a multiple connector wherein a plurality of electrical connections may be made and disconnected as a unit.

Connectors of this type are customarily provided with a solid phenolic or other rigid composition body, which is permanently molded about a plurality of mating connector halves. The connections, when made, are exposed to the elements, permitting moisture to permeate the parts, with the possibility of a short circuit occurring. Such connections usually employ solder to secure the wire to the connectors, with the likelihood of some poor connections resulting thereby.

Attempts have been made to utilize a flexible insulating material for adaptation to an irregularly shaped supporting structure, but such connectors are not adapted to establish and disconnect multiple connections as a unit.

It is a primary object of my invention to provide a multiple connector that is adapted to readily accept or release individual connector halves and seal the connector halves tightly therein.

Further objects are to provide a multiple connector having the foregoing property, that will resist heavy tensile strains without the connectors pulling out of their positions; that will add to the ability of the wire connection to resist endwise strain; that possesses parts which may readily be replaced without loss of any of the other parts and which may be assembled into the completed connector with simplicity and ease; that possesses electrical connecting halves that may be crimped to wire conductors before assembly into the insulation body; and to accomplish the foregoing in a multiple connector that possesses a rigid housing that may be made of metal or other high structural strength materials.

I accomplish these and other objects and obtain my new results as will be apparent from the device described in the following specification, particularly pointed out in the claim, and illustrated in the accompanying drawing in which:

Fig. 1 is a plan view of a form of multiple connector containing my invention.

Fig. 2 is a longitudinally sectioned view taken in the plane 2—2 of Fig. 1.

Fig. 3 is a fragmentary view of abutting complementary multiple connectors.

Fig. 4 is a fragmentary view of a modified form of multiple connector body.

The multiple connector 10 of my invention comprises a rubbery insulation body 12 provided with molded recesses 14 having a shape corresponding to the individual connector halves 16 desired to be positioned therein. As shown in Fig. 4, the insulation body may be formed in two parts like the upper and lower members 18 and 20 having groove portions 22 and 24, respectively, which are equivalent to the molded recesses 14 when assembled.

The rubbery insulation body may be made of soft rubber, as an example. Thus, lip portions 26 may be formed about the body entrance to each recess, so that complementary multiple connectors 10a, when joined together under pressure, will cause the abutting lips 26 and 26a to engage each other and individually seal off the electrical connections against moisture or other atmospheric deteriorating influences.

The resilient insulation body containing the completed connections is positioned into a frame or housing 28, which may be cup-shaped, and provided with the cover 30. The rubber body may be slightly greater in volume than the housing, causing an internal pressure to be developed when the closing bolts 32 are applied, forcing the insulating body to be resiliently compressed about each electrical connector half 16, securing and simultaneously sealing the connector thereto. The rubber body may, however, be equal or less in volume than the housing, if the cover plate is capable of entering the housing to provide the internal pressure.

The housing and cover plate may be made of rigid insulation material or metal, if desired, since the body 12 adequately insulates the connections from each other. Where pin connectors are employed, the housing face into which they are inserted should preferably be made of insulating material, to prevent accidental short circuit when mating two complementary connectors.

The openings 33 in the housing 28 are large enough to permit the resilient lips 26 to project therethrough for abutment with the corresponding parts of complementary connectors to provide a moisture proof seal. Ridges 34 and 36 may be provided on the inward surface of the housing 28 adjacent the openings 33 to keep the rubbery body 12 from a shifting in position under the pressures developed by the closing bolts 32.

The closing bolts may be conveniently provided with polarizing extensions 38 to insure correct orientation with the mating connector.

The construction lends itself to great ease in assembling the parts. If the connector halves are to be indented to electric wires 40, as shown, the connections are first made. The connectors are then inserted into the recesses which, being uncompressed, accept the inserted connector halves without difficulty. The rubbery body is then inserted in the frame or housing, and compressed, as aforesaid, to seal and secure the connectors thereto. The resulting construction permits loosening of the parts to replace any single connection or group of connections thereto. The frame and rubbery body are each reusable with other parts, providing substantial economy.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

I claim:

A connector comprising a resilient insulation body having at least two cooperating sections, each section including at least one groove therein, the grooves of said cooperating sections co-acting to form a recess for receiving a free part to be releasably secured to said connector, an outer frame and cover for said resilient body provided with tightening means for applying and releasing the pressure to said part, said body having a face in contact with said frame and another parallel face in contact with said cover, said sections of the body being unbroken between said faces, whereby said part may be mechanically secured in said resilient insulation and freely released therefrom by loosening said tightening means.

References Cited in the file of this patent

UNITED STATES PATENTS

| | | | |
|---|---|---|---|
| 2,249,827 | Herman | July 22, | 1941 |
| 2,265,341 | Brochert | Dec. 9, | 1941 |
| 2,443,654 | Else et al. | June 22, | 1948 |
| 2,536,652 | Metcalfe | Jan. 2, | 1951 |
| 2,563,712 | Frei et al. | Aug. 7, | 1951 |
| 2,658,182 | Jackson | Nov. 3, | 1953 |
| 2,688,735 | Hubbell | Sept. 7, | 1954 |

FOREIGN PATENTS

| | | | |
|---|---|---|---|
| 595,178 | Great Britain | Nov. 28, | 1947 |
| 595,187 | Great Britain | Nov. 28, | 1947 |